(12) United States Patent
Kondo (10) Patent No.: US 8,792,431 B2
(45) Date of Patent: Jul. 29, 2014

(54) WIRELESS COMMUNICATION APPARATUS AND METHOD FOR WIRELESS COMMUNICATION

(75) Inventor: Taiji Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 12/987,641

(22) Filed: Jan. 10, 2011

(65) Prior Publication Data

US 2011/0141989 A1    Jun. 16, 2011

Related U.S. Application Data

(63) Continuation of application No. PCT/JP2008/062759, filed on Jul. 15, 2008.

(51) Int. Cl.
| | |
|---|---|
| H04W 72/04 | (2009.01) |
| H04W 72/08 | (2009.01) |
| H04W 16/14 | (2009.01) |
| H04W 72/12 | (2009.01) |
| H04W 88/06 | (2009.01) |
| H04L 5/00 | (2006.01) |

(52) U.S. Cl.
CPC ............ H04W 72/082 (2013.01); *H04W 88/06* (2013.01); *H04L 5/0007* (2013.01); H04W 16/14 (2013.01); H04W 72/1215 (2013.01)
USPC ............................. 370/329; 370/328; 370/330

(58) Field of Classification Search
CPC ...... H04W 80/04; H04W 72/04; H04W 84/12
USPC ......... 370/327, 328, 329, 330, 345, 347, 348, 370/466, 467, 201, 208, 286, 350; 375/346, 375/348
See application file for complete search history.

(56) References Cited

U.S. PATENT DOCUMENTS

| | | |
|---|---|---|
| 7,324,486 B2 | 1/2008 | Noguchi et al. |
| 2003/0069008 A1 | 4/2003 | Nakazawa et al. |

(Continued)

FOREIGN PATENT DOCUMENTS

| | | |
|---|---|---|
| CN | 1411162 | 4/2003 |
| EP | 1467518 | 10/2004 |

(Continued)

OTHER PUBLICATIONS

Notice of Preliminary Rejection issued by the Korean Intellectual Property Office for corresponding Korean Patent Application No. 10-2001-7000295 mailed Apr. 2, 2012 with English translation.

(Continued)

*Primary Examiner* — Ian N Moore
*Assistant Examiner* — Hien Nguyen
(74) *Attorney, Agent, or Firm* — Myers Wolin, LLC (57) ABSTRACT

A wireless communication apparatus includes: a first signal communicating unit that receives a first signal of a first wireless communication system or transmits, based on allocation information of a wireless communication resource which information is transmitted in a predetermined cycle, the first signal of the first wireless communication system; a second signal communicating unit that receives or transmits a second signal of a second wireless communication system different from the first wireless communication system; and a controller that restricts the first signal communicating unit to transmit the first signal of the first wireless communication system using a wireless communication resource allocated by the allocation information while the second signal communicating unit transmits or receives the second signal.

2 Claims, 5 Drawing Sheets (56) References Cited

U.S. PATENT DOCUMENTS

| | | |
|---|---|---|
| 2004/0208140 A1 | 10/2004 | Noguchi et al. |
| 2005/0020299 A1* | 1/2005 | Malone et al. ............. 455/552.1 |
| 2006/0094364 A1 | 5/2006 | Hirota et al. |
| 2007/0129104 A1 | 6/2007 | Sano et al. |
| 2007/0232358 A1* | 10/2007 | Sherman ....................... 455/560 |
| 2009/0129367 A1* | 5/2009 | Bitran .......................... 370/350 |
| 2010/0046496 A1* | 2/2010 | Hall ............................. 370/345 |

FOREIGN PATENT DOCUMENTS

| | | |
|---|---|---|
| EP | 1653672 | 5/2006 |
| EP | 1838040 | 9/2007 |
| JP | 2003-125445 | 4/2003 |
| JP | 2006-129247 | 5/2006 |
| JP | 2007-142684 | 6/2007 |
| JP | 4116563 | 7/2008 |
| WO | 2008/001272 | 1/2008 |
| WO | 2008/070777 | 6/2008 |
| WO | 03-047174 | 1/2010 |

OTHER PUBLICATIONS

International Search Report issued for corresponding International Patent Application No. PCT/JP2008/062759, mailed Sep. 9, 2008.
First Notification of Office Action issued for corresponding Chinese Patent Application No. 200880130348.5, issued Jan. 28, 2013, with English translation.
European search report, the supplementary European search report and the European search opinion issued for European Patent Application No. 08778179.5, dated Dec. 5, 2013.

* cited by examiner

WIRELESS COMMUNICATION APPARATUS AND METHOD FOR WIRELESS COMMUNICATION

CROSS-REFERENCE TO RELATED APPLICATION

This application is a continuation Application of a PCT international application No. PCT/JP2008/062759 filed on Jul. 15, 2008 in Japan, the entire contents of which are incorporated by reference.

FIELD

The embodiments discussed herein are related to a wireless communication apparatus and a method for wireless communication.

BACKGROUND

WiMAX (Worldwide interoperability for Microwave Access) is one of wireless broadband communication systems being standardized in the IEEE (Institute of Electrical and Electronic Engineers). For example, installation of a function of a short distance wireless communication system, such as Bluetooth® or WLAN (Wireless Local Aria Network), to a mobile terminal complying with the wireless broadband communication system such as WiMAX makes the mobile terminal to solely perform a variety of functions.

Here, the frequency band of WiMAX and the frequency of Bluetooth or WLAN overlap around 2.4 GHz. In other words, the same frequency is competitively used by a number of communication systems. For this reason, if a mobile terminal which supports both communication of WiMAX and communication of Bluetooth or WLAN carries out the both communication at the same time through the overlapping frequency, one of communications interferes with the other communication, which may be a cause of lowering the throughput.

In order to inhibit interference among a number of communication systems that uses the same wireless resource (e.g., frequency, timing), one of effective solutions is to control timings of data transmission and data reception of respective communication systems so as not to overlap by allocating a wireless resource to respective communication systems through the TDM (Time Division Multiplexing) scheme.

For example, Patent Literature 1 describes a technique of, in a mobile terminal which can transmit and receive signals of a communication system (hereinafter sometimes called WiMAX system) of WiMAX and signals of a communication system (hereinafter sometimes called Bluetooth system) of Bluetooth, transmitting and receiving the signals of the Bluetooth system at a frame timing while the WiMAX system is in a sleep mode. Patent Literature 1: U.S. Patent Application Publication No. US 2007/0232358

In a wireless communication system which carries out data transmission and data reception through the use of wireless frames synchronized with a base station, the base station intensively controls allocation of wireless resource.

In this case, for example, it is inconvenient that a mobile terminal confirming to a number of communication systems independently decides to release a wireless resource allocated to transmission of one of the communication systems and to use the released resource for transmission of another one of communication without negotiation with the base station.

To avoid this inconvenience, the base station controls allocation of the wireless resource to a mobile terminal communicable through a number of communication systems using the same wireless resource (e.g., frequency) through the use of the TDM scheme or the like such that timings of signal transmission and receiving of the respective communication system overlap.

However, increase in the number of mobile terminals connected to a base station complicates management of the wireless resource by the base station. Specifically in this case, the base station negotiates with each individual mobile terminal and controls the above allocation of the wireless resource to the individual mobile terminal.

That increases processing load on the base station, so that the throughput of communication with each mobile terminal may be lowered.

SUMMARY (1) According to an aspect of the embodiments, an apparatus includes a wireless communication apparatus including: a first signal communicating unit that receives a first signal of a first wireless communication system or transmits, based on allocation information of a wireless communication resource which information is transmitted in a predetermined cycle, the first signal of the first wireless communication system; a second signal communicating unit that receives or transmits a second signal of a second wireless communication system different from the first wireless communication system; and a controller that restricts the first signal communicating unit to transmit the first signal of the first wireless communication system using a wireless communication resource allocated by the allocation information while the second signal communicating unit transmits or receives the second signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, description will now be made in relation to a first embodiment with reference to accompanying drawings. However, the embodiment to be detailed below is a mere example, so there is no intention of excluding another embodiments and variations and application of techniques that are not mentioned in this specification. In other words, various changes and modifications (e.g., combination of the embodiments and the modifications) can be suggested without departing from the spirit of the embodiment.

(1) The Entire Configuration of a First Embodiment
(a) About WiMAX

[About Wireless Frame]

As one example of communication schemes, WiMAX adopts a communication scheme based on Orthogonal Frequency Division Multiplexing (OFDMA).

A WiMAX system of the first embodiment uses wireless frames defined in terms of the time axis segmented by OFDMA symbol time and the frequency axis segmented by sub-channel (logical set of orthogonal sub-carriers). For example, in allocation of wireless frames, the base station segments the time domain of a sub-channel shared by mobile terminals, serving as examples of wireless communication apparatus, in units of OFDMA symbol number and then dynamically allocates the segmented sub-channel to respective mobile terminals.

To multiplex Downlink (DL) communication from a base station to a mobile terminal (hereinafter also called "mobile station") and Uplink (UL) communication from the mobile terminal to the base station, Frequency Division Duplex (FDD) scheme in which DL and UL use different frequency channels or Time Division Duplex (TDD) scheme in which DL and UL use different time domain on the same frequency channel.

Figure 1:
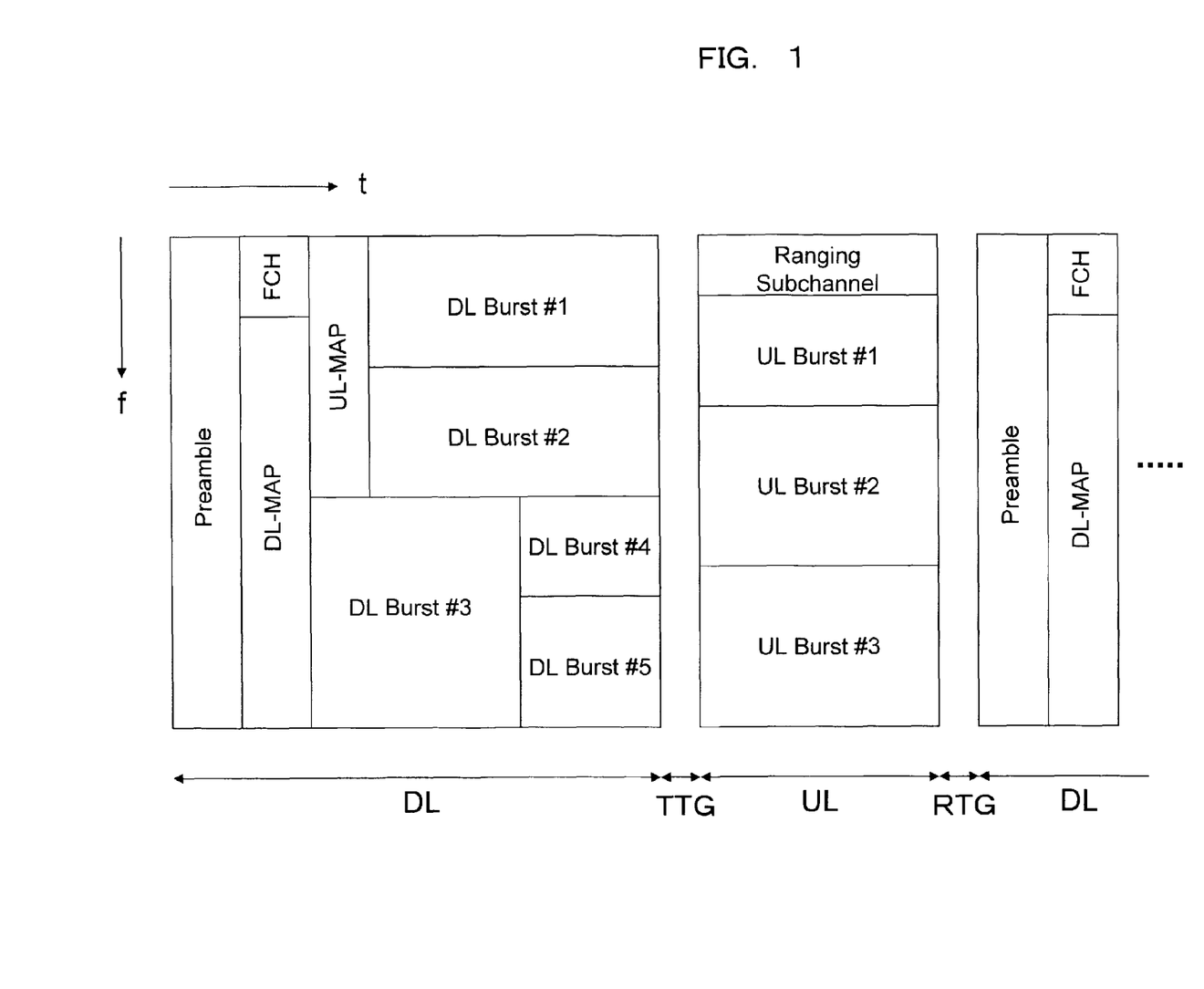
FIG. 1 is a diagram illustrating an example of format of a wireless frame used in a WiMAX system.

FIG. 1 illustrates an example of the format of a TDD-scheme wireless frame used in the WiMAX system.

In FIG. 1, the abscissa represents time (t); the ordinate represents frequency (f); DL represents a DL sub-frame used in downlink communication; and UL represents a UL sub-frame used in uplink communication. TTG (Transmit/Receive Transition Gap) and RTG (Receive/Transmit Transition Gap) represent gaps due to transition between transmission and reception.

The preamble in the front of the DL sub-frame is used by each mobile terminal that transmits and receives signals to and from a base station for synchronize with the base station.

FCH represents Frame Control Header including information to specify the modulation scheme and the coding scheme of the MAP information (DL-MAP, UL-MAP). By referring the information in the FCH, the mobile terminal can correctly demodulate and decode subsequent DL/UL-MAP. DL-MAP is allocation information of DL Burst (frequency, timing) serving an example of the wireless resource; and UL-MAP is allocation information of UL Burst (frequency, timing) serving an example of the wireless resource. DL Burst and UL Burst is a DL data transmitting region and an UL data transmitting region, respectively.

The allocation information (Burst Profile) of DL-MAP and that of the UL-MAP include mapping information and information about data transmitting schemes of the Bursts in the DL sub-frames and the UL sub-frames, respectively. Accordingly, the mobile terminal receives data in a region of the DL Burst indicated by the DL-MAP and transmits data to the base station in a region of the UL Burst indicated by the UL-MAP. Providing that the transmission cycle defined by a DL sub-frame and an UL sub-frame is one frame, the allocation information of the UL-MAP may represent allocation of the UL burst at the N-th frame (N is a natural number) or allocation of the UL Burst at the (N+1)-th frame (or a subsequent frame).

Ranging Sub-channel is a transmitting region of a CDMA (Code Division Multiple Access) ranging code to be used for ranging to adjust timing and transmitting electric power level when the mobile terminal is establishing a connection to the base station.

Allocation of the wireless resource is accomplished by the mobile terminal transmitting a signal requesting a band through which the mobile terminal communicates and the base station mapping based on the information included in the request signal.

[About Retransmission Control]

The WiMAX system includes a function of controlling retransmission of data by means of Automatic Repeat Request (ARQ) in a MAC (Medium Access Control) layer.

A receiver of data detects an error in received data through the use of redundant bits for error detection that the data transmitter attached to each data unit. If the receiver detects an error in the received data or does not receive the data, the receiver transmits a signal (NACK signal) that requests the transmitter to retransmit, to the transmitter, the data in which the error has been detected or the data cannot be received by the receiver. Upon receipt of the NACK signal, the transmitter retransmits the data for which retransmission has been requested. If no error is detected in the received data, the receiver transmits a signal (ACK signal) notifying successful reception to the transmitter. In response to receipt of the ACK signal, the transmitter transmits another data to the receiver.

The above function of controlling retransmission makes it possible to improve the reliability of data communication.

(b) About Bluetooth

Bluetooth carries out bidirectional communication of data between a master and a slave, which carries out communication under the control of the master, via TDD scheme.

For example, one second (s) is divided into 1,600 time slots (625 µs per time slot), and the time slots are allocated time slot numbers ts0, ts1, ts2, . . . . The master transmits data to the slave during, for example, even time slots while the slave transmits data to the master during odd time slots.

Figure 2:
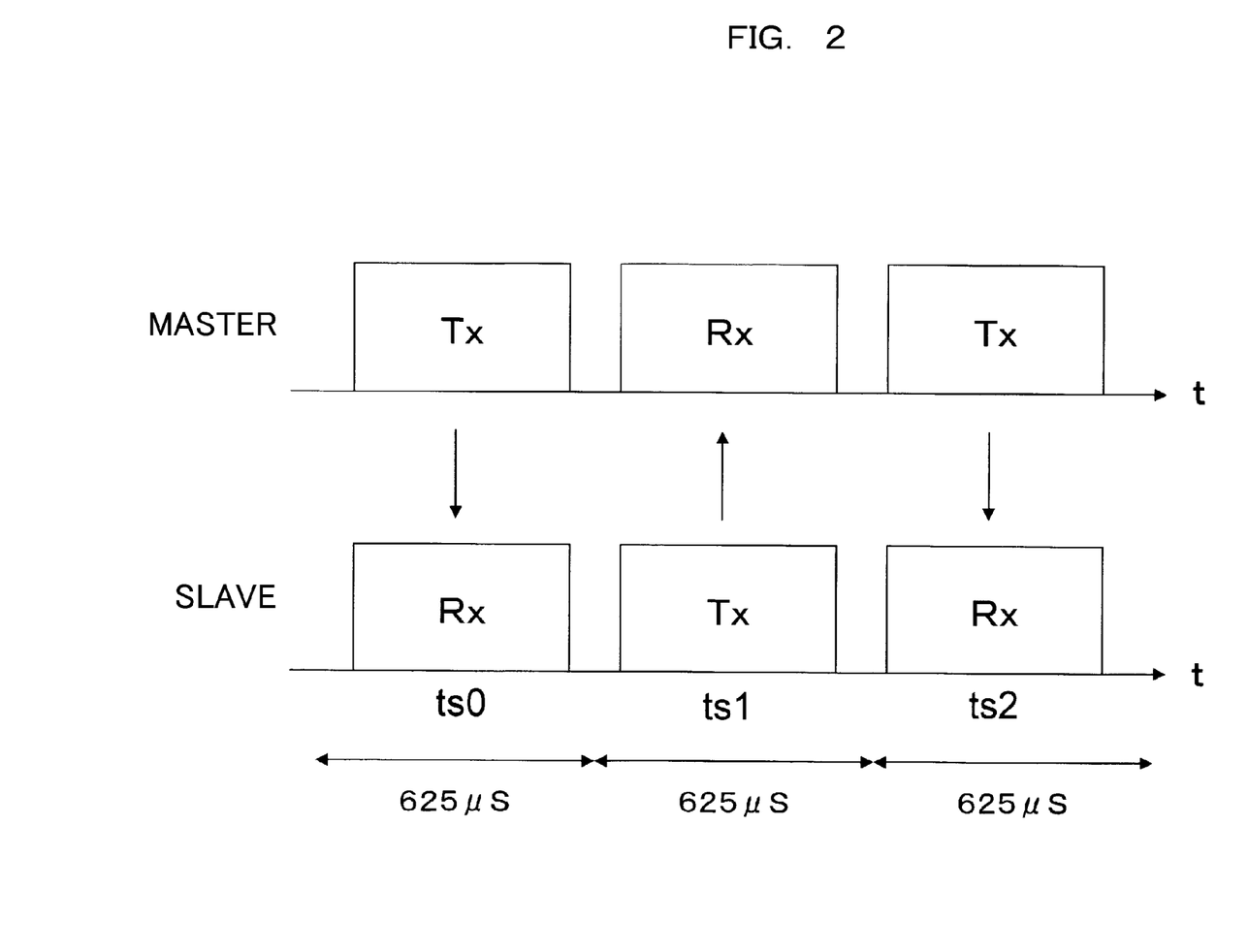
FIG. 2 is a diagram illustrating an example of a time slot used in a Bluetooth system.

FIG. 2 illustrates an example of time slot used in the Bluetooth system. In FIG. 2, Tx and Rx represent transmitting data and received data. As one example, the master transmits data during time slots ts0 and ts2 while the slave transmits data during time slot ts1.

The master and the slave are independently of each other capable of frequency hopping, that is, varying the transmitting frequency for each data transmission.

Time slot may be a single slot in units of one slot (625 µs) and a multi slot in units of a number of slots, such as three slots 1,875 µs) or five slots (3,125 µs). In a single slot, data communication is carried out at the same frequency throughout one slot; and in a multi slot, data communication is carried out at the same frequency throughout three or five slots.

Here, in Bluetooth, timing is adjusted by a clock (counter) installed in a terminal having a Bluetooth communication function. For example, the master and the slave are synchronized with each other by calculating an offset of clock values of the master and the slave and adding the offset to either clock value.

(c) Example of Operation

Figure 3:
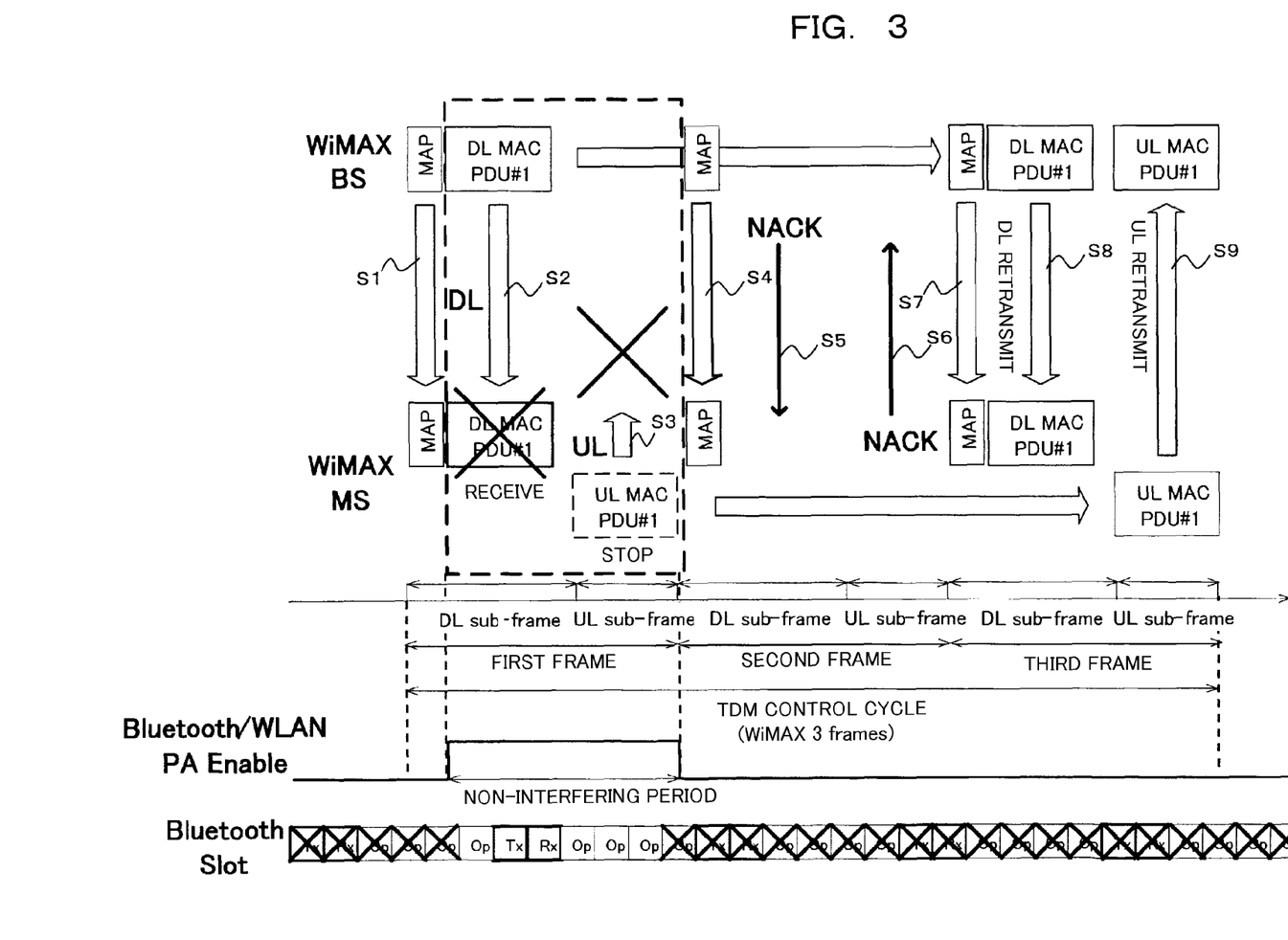
FIG. 3 is a diagram illustrating an example of operation performed in a first embodiment.

FIG. 3 illustrates an example of operation performed in the first embodiment.

Hereinafter, description will now be made in relation to operation of a mobile terminal which is equipped with a communication function of the WiMAX system (first wireless communication system) and a communication function of the Bluetooth system (second wireless communication system) and to which the first embodiment is applied.

In FIG. 3, WiMAX BS (Base Station) and WiMAX MS (Mobile Station) represent states of transmitting and receiving signals (data) at the base station and the mobile terminal, respectively.

"WiMAX frame" represents a wireless frame of the WiMAX system. "DL sub-frame" represents a DL sub-frame. "UL sub-frame" represents a UL sub-frame. Here, a set of a DL sub-frame and a UL sub-frame is regarded as one frame and three frames are a TDM controlling cycle. Hereinafter, the first, the second, and the third frame in a single TDM controlling cycle are simply called the first frame, the second frame, and the third frame, respectively.

"Bluetooth PA (Power Amp) Enable" represents time period during which the amplifier, such as a power amplifier, included in a transmitting circuit in the Bluetooth system is enable or disable.

A period during which data transmission and reception of the WiMAX system is restricted and during which concurrently the Bluetooth is provided with an opportunity for communication is defined as a Non-interfering period. In the example of FIG. 3, the amplifier is enabled during the Non-interfering period while is disabled during period except the Non-interfering period. In other words, during the time slots not included in the Non-interfering period, data transmission of the Bluetooth system is restricted. The terms "restrict" and "restriction" means transmission and receiving processing is stopped or limited (inhibited). The processing of "limiting (inhibiting)" includes, for example, lowering the transmitting power, that is, signal transmitting is continued under a state of lowering the transmission power to an extent that occurs no interference. As one example of the present invention, the Non-interfering period is set in the first frame of the TDM controlling cycle.

Bluetooth Slot represents time slots of the Bluetooth. Tx represents a time slot for data transmission; Rx represents a time slot for data reception; and Op represents an optional time slot during which data can be transmitted and received. A time slot with a cross (x) represents a time slot which is not included in the Non-interfering period and during which data transmission is inhibited.

Hereinafter, description will now be made in relation to control over data transmission and reception at the mobile terminal in a TDM controlling cycle.

In the first frame, the Non-interfering period is set in the mobile terminal, and during the Non-interfering period, the amplifier included in the transmitting circuit of the Bluetooth system is enabled so that the data is transmitted in the Bluetooth system.

Here, the Non-interfering period can be set so as not to overlap with a period during which Map information, to be detailed below, in a DL sub-frame is transmitted from the base station to the mobile terminal. This setting makes the mobile station possible to improve the ratio of success in receiving MAP information transmitted from the base station, concurrently suppressing interference caused by transmitting signals in the Bluetooth system.

Through the DL sub-frame of the first frame, the base station transmits the MAP information to the mobile terminal (S1). The MAP information includes information about DL-MAP of the first frame, and UL-MAP information of the first or the second frame. By referring the MAP information, the mobile terminal can obtain the allocation information of the communication region of the DL sub-frame or the UL sub-frame of the first frame.

In succession, the base station transmits DL MAC-PDU (DownLink Medium Access Control layer-Protocol Data Unit) #1 destined for the mobile terminal through the DL Burst region of the DL sub-frame of the first frame (S2).

Since the Non-interfering period is concurrently set in the mobile terminal, the amplifier included in the transmitting circuit of the Bluetooth system is enabled, so that data is transmitted in the time slot Tx and data is received in the time slot Rx.

For the above, the signal including DL MAC-PDU #1 transmitted from the base station may be subjected to interference with a Bluetooth signal transmitted at the time slot Tx. If the interference is large enough to damage the DL MAC-PDU #1, the mobile terminal detects an error in the data.

Through the UL sub-frame of the first frame, the mobile terminal restricts (e.g., stops or limits transmitting processing) data transmission of the WiMAX system, and in turn, carries out data transmission of the Bluetooth system (S3). This restricts the transmission of UL MAC-PDU #1, which should be transmitted to the base station through the communication region allocated in the same UL sub-frame. Accordingly, the base station detects that the UL MAC-PDU #1 is not received or that the reception of the UL MAC-PDU #1 is failed. The restriction of data transmission of the WiMAX system in the mobile terminal is withdrawn when the Non-interfering period expires. In the example of FIG. 3, the Non-interfering period expires at the end of the first frame. The timing of the withdrawal is satisfactory any time point before the mobile terminal receives the MAP information transmitted from the base station in the next transmission cycle. The terms of "withdraw" and "withdrawal" means that data transmission is started or lowered transmission electric power is regained.

During the second and the third frames, the amplifier included in the transmitting circuit of the Bluetooth system is disabled, so that the data transmission of the Bluetooth system is inhibited.

Through the DL sub-frame of the second frame, the base station transmits MAP information about the DL sub-frame of the second frame and the UL sub-frames of the second and the third frames (S4). The MAP information includes the DL-MAP of the second frame and the UL-MAP of the second or the third frame.

If the base station detects that the base station does not receive the UL MAC-PDU #1 or failed in receiving the UL MAC-PDU#1 from the mobile terminal, the base station transmits a NACK signal for the UL MAC-PDU#1 through the DL sub-frame of the second frame to the mobile station in order to request retransmission of the data (S5).

If the mobile terminal detects that the mobile terminal does not receive the DL MAC-PDU #1 or failed in receiving the DL MAC-PDU #1 from the base station, the mobile terminal transmits a NACK signal for the DL MAC-PDU#1 through the UL sub-frame of the second frame to the base station in order to request retransmission of the data (S6).

If the base station succeeds in receiving the UL MAC-PDU#1 or the mobile station succeeds in receiving the DL MAC-PDU#1 in the Non-interfering period, an ACK signal is returned to the source that transmitted the data by means of the second frame.

Due to some reason, such as processing load on the base station and/or the mobile station, NACK and ACK signals may be transmitted in the third frame or later.

Through the DL sub-frame of the third frame, the base station transmits MAP information about the DL sub-frame and the UL sub-frame of the third frame to the mobile station (S7). The MAP information includes information about the DL-MAP of the third frame and UL-MAP of the third frame or the first frame of the next TDM controlling cycle.

If the base station receives the NACK signal through the UL sub-frame of the second frame, the base station transmits (retransmits) the DL MAC-PDU #1 to the mobile station through the DL sub-frame of the third frame (S8) in response to the reception of the NACK signal.

If the mobile station receives the NACK signal through the DL sub-frame of the second frame from the base station, the mobile terminal transmits (retransmits) the UL MAC-PDU #1 to the base station through the UL sub-frame of the third frame (S9) in response to the reception of the NACK signal.

The above procedure makes the mobile terminal possible to correctly transmit or receive data of the WiMAX system, which data has not been correctly transmitted to or received from the base station during the Non-interfering period set in the first frame, in the third frame or later. Furthermore, during the Non-interfering period, data of the Bluetooth system can be transmitted and received in a state of inhibiting interference with signals of the WiMAX system, so that communication throughput of the Bluetooth system can be inhibited from lowering.

In the above example, the TDM controlling cycle is assumed to include three frames, but is not limited to three frames. Namely, a period set to be the Non-interfering period and a period set to control retransmission of data of the WiMAX system can be varied. For example, the TDM controlling cycle may include a number of frames as many as the sum of the frames of the Non-interfering period and frames that affords to data retransmission control of the WiMAX system.

The above example restricts data transmission using a UL sub-frame during the Non-interfering period in relation to data transmission and reception of the WiMAX system at the mobile terminal. Alternatively, data reception using the DL sub-frame may be restricted (e.g., stop or limit reception processing) during the same period. In other words, only transmission may be restricted or both transmission and reception may be restricted.

In the above example, the Non-interfering period is set within the first frame, but alternatively may be a period until the mobile terminal receives a NACK signal transmitted from the base station through a DL sub-frame in the second frame or later.

Figure 4:
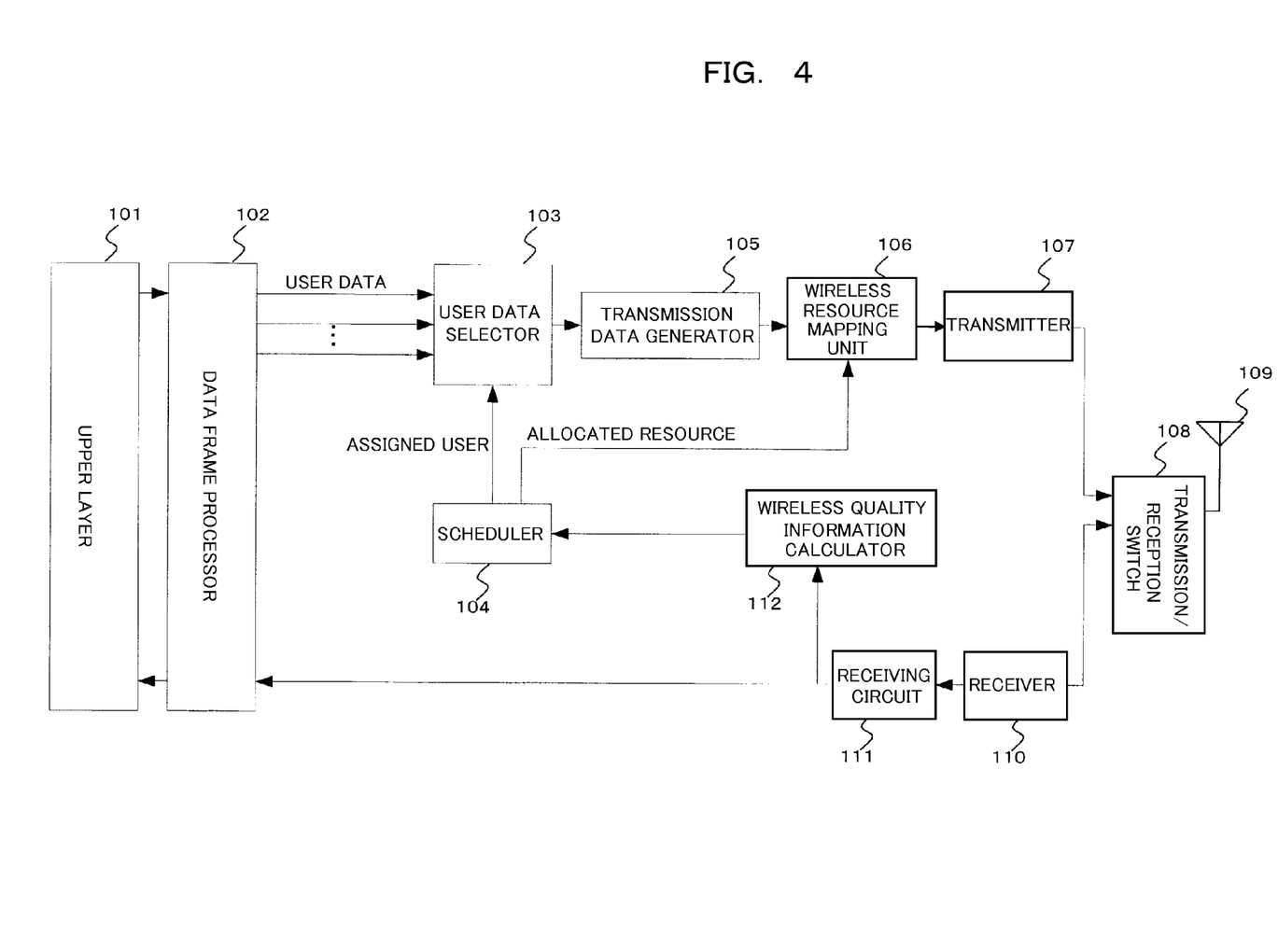
FIG. 4 is a block diagram illustrating an example of the configuration of a base station.

(2) An Example of the Configuration and the Operation of a Base Station Used in the First Embodiment FIG. 4 is a block diagram illustrating an example of the configuration of a base station of the first embodiment.

In FIG. 4, reference number 101 is an upper layer; 102 represents a data frame processor; 103 represents a user data selector; 104 represents a scheduler; 105 represents a transmitting data generator; 106 represents a wireless resource mapping unit; 107 represents a transmitter; 108 represents a transmission and reception switch; 109 represents an antenna; 110 represents a receiver; 111 represents a receiving circuit; and 112 represents a wireless quality information calculator.

The data frame processor 102 attaches a header to a PDU forwarded from the upper layer 101, forms data to be transmitted to each user (mobile terminal) communicating with the base station into frames, and sends the transmitting data in the form of frames to the user data selector 103.

The scheduler 104 controls allocation of a wireless resource to transmit data sent to the user data selector 103 to respective mobile terminals. For example, the allocation is accomplished in units of a frame of the transmitting data.

Information of allocation of the wireless resource by the scheduler 104 is included in the MAP information generated by the transmitting data generator 105. The MAP information is mapped in the communication region (DL/UL-MAP) for the MAP of the wireless resource in the wireless resource mapping unit 106, is modulated or otherwise processed by the transmitter 107, and is then transmitted (to the destinations) via the antenna 109.

Data (including, for example, ACK/NACK signal and various control messages) to be transmitted to respective mobile terminal is mapped in respective communication regions (DL/UL Bursts) of the wireless resource by the wireless resource mapping unit 106 under the control of the scheduler 104, is modulated or otherwise processed by the transmitter 107, and is then transmitted (to the destinations) via the antenna 109.

A signal received from each mobile terminal via the antenna 109 is demodulated or otherwise processed by the receiver 110 and is then transmitted to the receiving circuit 111. Received data included in the received signal is divided into PDUs by the data frame processor 102 and is then forwarded to the upper layer 101.

The receiving circuit 111 measures instantaneous quality of the received signal and sends the measured instantaneous quality information of the received signal of each mobile terminal to the wireless quality information calculator 112. The wireless quality information calculator 112 calculates the average wireless quality information for a predetermined time period of each mobile terminal using instantaneous quality information of the mobile terminal received from the receiving circuit 111, and sends the average wireless quality information to the scheduler 104. The average the wireless quality information may be sent along with the instantaneous quality information to the scheduler 104.

On the basis of the instantaneous quality information and/or the average wireless quality information of each mobile terminal sent from the wireless quality information calculator 112, the scheduler 104 allocates a wireless resource to the respective mobile terminals.

The transmission and reception switch 108 switches between transmission and reception such that, for example, the antenna 109 is connected to a transmitting circuit including the transmitter 107 during DL while the antenna 109 is connected to the receiving circuit including the receiver 110 during UL.

Figure 5:
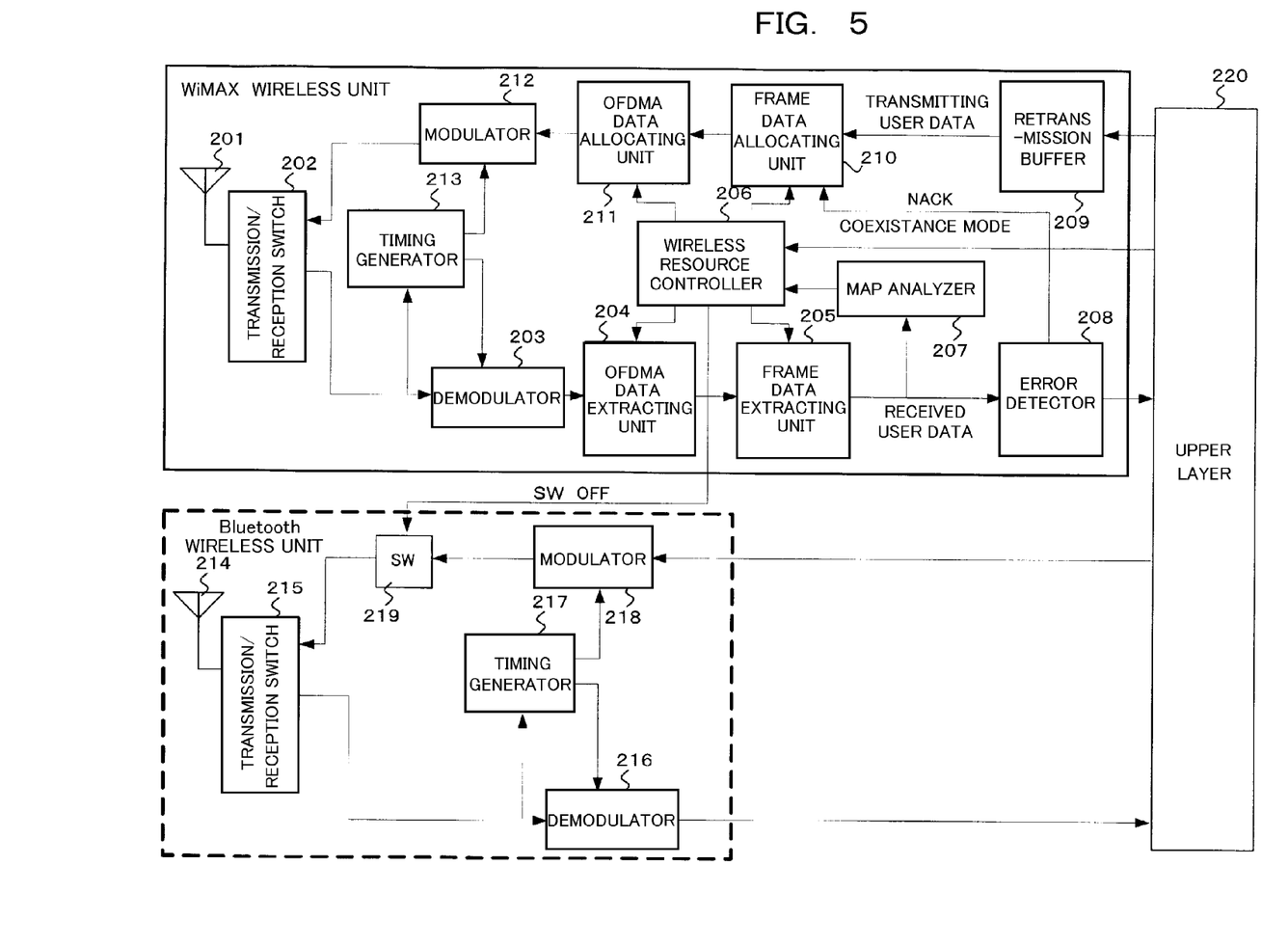
FIG. 5 is a block diagram illustrating an example of the configuration of a mobile station.

(3) An Example of the Configuration and the Operation of a Mobile Terminal Used in the First Embodiment FIG. 5 is a block diagram schematically illustrating an example of the configuration of a mobile terminal according to the first embodiment.

In the example of FIG. 5, the mobile terminal has communication functions of a first communication system and a second communication system exemplified by the WiMAX system and the Bluetooth, respectively.

In the wireless unit (WiMAX wireless unit) of the WiMAX system illustrated in FIG. 5, the reference number 201 represents an antenna; 202 represents a transmission and reception switch; 203 represents a demodulator; 204 represents OFDMA data extracting unit; 205 represents a frame data extracting unit; 206 represents a wireless resource controller; 207 represents a MAP analyzer; 208 represents an error detector 208; 209 represents a retransmitting buffer; 210 represents a frame data allocating unit; 211 represents an OFDMA data allocating unit; 212 represents a modulator; and 213 represents a timing generator.

In the wireless unit (Bluetooth wireless unit) of the Bluetooth system illustrated in FIG. 5, the reference number 214 represents an antenna; 215 represents transmission and reception switch; 216 represents a demodulator; 217 represents a timing generator; 218 represents a modulator; and 219 represents a switch (SW).

The reference number 220 represents an upper layer that provides various applications and others.

In the wireless unit of the WiMAX system, a signal received through the antenna 201 is subjected orthogonal demodulation in the demodulator 203 to be converted into a digital signal, which is then sent to the OFDMA data extracting unit 204. The demodulator 203 carries out processing on the basis of timing signals which are generated by the timing generator 213 and which are synchronized with the base station.

The OFDMA data extracting unit 204 extracts information about sub-carrier allocated to the mobile terminal itself from information of respective sub-carrier obtained through FFT (Fast Fourier Transform) on the received signal from a time-axis signal to a frequency-axis signal under the control of the wireless resource controller 206.

The frame data extracting unit 205 extracts information of received data destined for the mobile terminal itself from information extracted by the OFDMA data extracting unit 204 under the control of the wireless resource controller 206.

Upon receipt of MAP information such as DL-MAP and UL-MAP, the MAP analyzer 207 analyzes the received MAP information and sends the wireless resource controller 206 allocation information of a wireless resource allocated to the mobile terminal itself obtained by the result of the analysis.

Upon receipt of the allocation information of the mobile terminal itself sent from the MAP analyzer 207, the wireless resource controller 206 controls the OFDMA data extracting unit 204, the frame data extracting unit 205, the frame data allocating unit 210, and the OFDMA data allocating unit 211 on the basis of the received allocation information.

During the Non-interfering period of the FIG. 3, the wireless resource controller 206 restricts (stops or limits) processing of the frame data allocating unit 210 and the OFDMA data allocating unit 211. Additionally, during the Non-interfering period, the wireless resource controller 206 may restrict (stop or limit) the processing of the OFDMA data extracting unit 204 and the frame data extracting unit 205.

The wireless resource controller 206 further turns "ON" the switch 219 included in the wireless unit of the Bluetooth system during the Non-interfering period and turns "OFF" the switch 219 during a period except of the Non-interfering period. In other words, the wireless resource controller 206 sends the switch 219 control signal that causes the switch 219 to turn "OFF" during the Non-interfering period.

The received data destined to the mobile terminal itself, which data is extracted by the frame data extracting unit 205, is sent to the error detector 208, which then checks the presence or the absence of an error in the received data through the use of an error detection code, such as CRC, attached to the received data. If no error is detected, the same received data is forwarded to the upper layer 220. In this case, the error detector 208 can send the frame data allocating unit 210 a signal that instructs allocation of transmission region to be used for transmitting an ACK signal to the base station. Conversely, if an error is detected in the received data, the error detector 208 sends the frame data allocating unit 210 a signal that instructs allocation of transmission region to be used for transmitting a signal (a NACK signal) requesting the base station to retransmit the same received data.

The retransmitting buffer 209 stores transmitting data forwarded from the upper layer 209. The retransmitting buffer 209 stores transmitting data during the Non-interfering period and, in the event of receipt of a NACK signal requesting retransmission of data from the base station, sends the transmitting data that the retransmitting buffer 209 is storing to the frame data allocating unit 210 in response to an instruction of the upper layer 220.

Under the control of the wireless resource controller 206, the frame data allocating unit 210 maps the transmitting data on the wireless resource region allocated to the mobile station itself, and further allocates a wireless resource to transmit an ACK/NACK signal in responsive to the instruction of the error detector 208.

Under the control of the wireless resource controller 206, the OFDMA data allocating unit 211 converts each sub-carrier of the signal in which transmitting data has been subjected to mapping by the frame data allocating unit 210 from a signal of the frequency axis to a signal to a time axis through performing IFFT (Inverse Fast Fourier Transform), and sends the signal obtained through the conversion to the modulator 212.

During the Non-interfering period, processing of the frame data allocating unit 210 and the OFDMA data allocating unit 211 are restricted (stopped or limited) by the wireless resource controller 206.

The signal obtained by the conversion in the OFDMA data allocating unit 211 is converted to analog signal, which is further subjected to orthogonal modulation, by the modulator 212. The resultant analog signal is transmitted through the antenna 201. The modulator 212 carries out processing on the basis of timing signal which are generated by the timing generator 213 and which are synchronized with the base station.

The transmission and reception switch 202 switches between the transmission and reception. For example, the transmission and reception switch 202 switches a circuit such that the antenna 201 is connected to the transmitting circuit including the modulator 212 during UL while the antenna 201 is connected to the receiving circuit including the demodulator 203 during DL. If antennas are provided one for each of the transmitting circuit and the receiving circuit, the transmission and reception switch 202 can be omitted.

The antenna 201 or the combination of the antenna 201 and the transmission and reception switch 202 can be regarded as a first signal communication unit.

In the wireless unit of the Bluetooth, the transmission and reception switch 215 switches between transmitting and receiving at the antenna 214 for each time slot. A received signal is demodulated by the demodulator 216 while the transmitting signal is modulated by the modulator 218. An exemplary modulating scheme of the Bluetooth is GFSK (Gaussian Frequency Shift Keying). The modulator 218 and the demodulator 216 perform on the basis of timing signals (i.e., clock) generated by the timing generator 217.

The switch 219 switches between ON/OFF, that is enabling/disabling, of a non-illustrated amplifier (e.g. power amplifier) for a transmitting signal. Under the control of the wireless resource controller 206 of the wireless unit of the WiMAX system, the switch 219 turns "ON" the amplifier during the Non-interfering period while tunes "OFF" during a period except for the Non-interfering period. Specifically, upon receipt of a control signal from the wireless resource controller 206, the switch 219 turns "OFF" the amplifier.

The combination of the antenna 214 and the transmission and reception switch 215 can be regarded as a second signal communication unit.

As described above, since the communication by the wireless unit of the WiMAX system is restricted during the Non-interfering period, occurrence of interference can be stopped or inhibited, which makes it possible to inhibit the throughput of transmitting and receiving signals in the wireless unit of the Bluetooth system from lowering. In contrast, since the communication by the wireless unit of the Bluetooth system during a period except for the Non-interfering period, data transmission of the wireless unit of the WiMAX system which transmission has been restricted during the Non-interfering unit can be carried out, suppressing interfering with communication of the wireless unit of the Bluetooth system.

(4) Others

The above first embodiment assumes the second wireless communication system coexists with the WiMAX system, that is the first wireless communication system, to be Bluetooth. An alternative to the second wireless communication system of the first embodiment may be WLAN having a communication frequency band overlapping with that of the WiMAX.

Alternatively, WLAN may be regarded as a third wireless communication system and the first embodiment may be applied to a case where both wireless communication systems Bluetooth and WLAN coexist with the WiMAX. In this case, the Non-interfering period can have communication period dedicated to the WLAN in addition to the communication period dedicated to the Bluetooth. Alternatively, a Non-interfering period dedicated to the WLAN communication may be set in the TDM controlling cycle separately from the Non-interfering period dedicated to the Bluetooth communication.

Besides the above communication system, the first embodiment can be applied to another system which employs a first communication system that carries out communication through wireless frames and which has a function of retransmission, and a second wireless communication system using wireless resource overlapping with wireless resource that can be used by the first communication system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A wireless communication apparatus comprising:
    a first signal communicating unit that receives a first signal of a first wireless communication system or transmits, based on allocation information of a wireless communication resource which information is transmitted in a predetermined cycle, the first signal of the first wireless communication system;
    a second signal communicating unit that receives or transmits a second signal of a second wireless communication system different from the first wireless communication system; and
    a controller that:
        restricts the first signal communicating unit to transmit the first signal of the first wireless communication system using the wireless communication resource and allows the second signal communicating unit to transmit or receive the second signal in a period of a first frame among a plurality of frames composing a TDM controlling cycle, the period during which the allocation information is not transmitted;
        does not restrict the first signal communicating unit to transmit the first signal of the first wireless communication system using the wireless communication resource allocated by the allocation information in any frame, among the plurality of frames, other than the first frame; and
        performs a retransmission control for retransmitting the first signal, which is not correctly transmitted or received in the first frame, in at least one frame, among the plurality of frames, subsequent to the first frame,
    wherein the controller withdraws the restriction by the time the controller receives the allocation information transmitted in the predetermined cycle after the controller starts the restriction, and
    wherein the controller receives a request to retransmit data which is not correctly transmitted or received during the restriction and the controller transmits, based on the allocation information received after the withdrawal of the restriction, the data in response to the request.

2. A method for wireless communication, the method comprising:
    at a first signal communicating unit, receiving a first signal of a first wireless communication system or transmitting, based on allocation information of a wireless communication resource which information is transmitted in a predetermined cycle, the first signal of the first wireless communication system;
    at a second signal communicating unit, receiving or transmitting a second signal of a second wireless communication system different from the first wireless communication system;
    restricting the first signal communicating unit to transmit the first signal of the first wireless communication system using the wireless communication resource and allowing the second signal communicating unit to transmit or receive the second signal in a period of a first frame among a plurality of frames composing a TDM controlling cycle, the period during which the allocation information is not transmitted;
    not restricting the first signal communicating unit to transmit the first signal of the first wireless communication system using the wireless communication resource allocated by the allocation information in any frame, among the plurality of frames, other than the first frame;
    performing a retransmission control for retransmitting the first signal, which is not correctly transmitted or received in the first frame, in at least one frame, among the plurality of frames, subsequent to the first frame,
    withdrawing the restriction by the time of receiving the allocation information transmitted in the predetermined cycle after starting the restriction, and
    receiving a request to retransmit data which is not correctly transmitted or received during the restriction and transmitting, based on the allocation information received after the withdrawal of the restriction, the data in response to the request.

* * * * *